Oct. 11, 1932.  S. MAKAROFF  1,882,188

VEHICLE LAMP

Filed April 10, 1930

S. Makaroff
INVENTOR

By: Marks & Clerk
Attys.

Patented Oct. 11, 1932

1,882,188

UNITED STATES PATENT OFFICE

SERGEI MAKAROFF, OF GREFSEN, NEAR OSLO, NORWAY

VEHICLE LAMP

Application filed April 10, 1930, Serial No. 443,181, and in Norway October 2, 1929.

When automobiles or similar vehicles pass each other in the night, the drivers have to dampen or screen the headlights of their automobile in order that dazzling shall not occur, and at the same time the speed must by necessity be reduced. But even if the headlights are dampened or screened the danger of dazzling is still present because the drivers of the automobiles have to calculate the lateral distance between the approaching automobiles and hereby their eyes during the displacement of the sight line from the headlight of the other vehicle to the non-illuminated highway do not react so rapidly that they adjust themselves to the darkness at the side of the automobile as is necessary under these conditions, and thereby dazzling effect occurs.

It has previously been suggested, in order to facilitate the passage of automobiles, to place a light at the left mud-guard of the front wheel and arrange said lamp in such way that it throws a concentrated bundle of light down upon the road at the side of the front wheel. However, the use of such lamps does not remove the possibility of dazzling, and accordingly the head lights have to be screened or entirely put out and the speed must be reduced during the passage.

The present invention aims at removing such drawbacks.

In accordance with the invention there is placed at one or both sides of the automobile, preferably at the front mud-guards, an auxiliary source of light so constructed and arranged that it emits at a substantial angle to the longitudinal direction of the vehicle a bundle of light having a relatively great angle of divergency in the horizontal plane, in such manner that at the side or sides of the vehicle in question there is obtained an area which is so illuminated and of such dimensions that the driver of the meeting vehicle is able to see the highway in his direction without the focus of his eye chamber, which is adjusted in accordance with the light from the other vehicle's head lights, needing any readjustment.

Preferably the source of light in question is placed behind the outer edge of the mudguard, and is so arranged that the proper source of light cannot be seen either by the driver of the approaching automobile or by passing pedestrians.

The drawing illustrates the invention by way of example.

Figure 1:
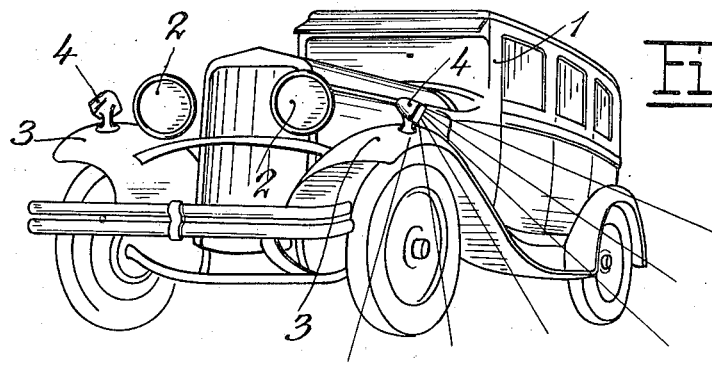
Fig. 1 is a perspective view of an automobile provided with auxiliary side lights in accordance with the invention.
Figure 2:
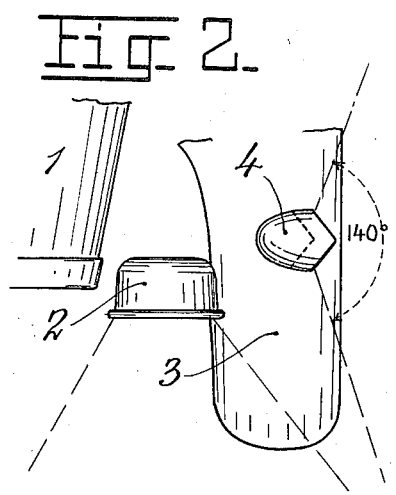
Fig. 2 shows a portion of the automobile with the arrangement seen from above.
Figure 3:
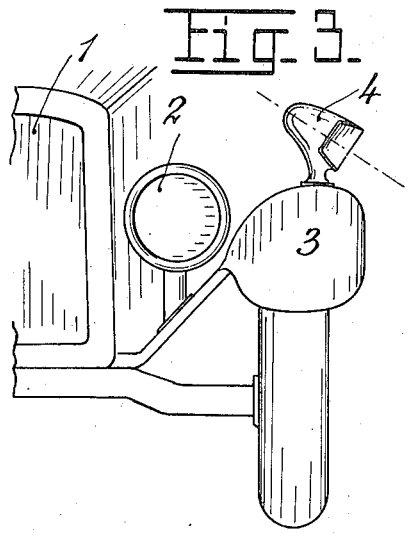
Fig. 3 is a front view of the arrangement shown in Fig. 2.

Referring now more particularly to the drawing there is provided an automobile 1 having usual head lights 2. At one or each of the front mud-guards 3, and preferably at their highest point, is placed an extra light device 4. As shown in Figs. 2 and 3 these light devices are so arranged that the axis of the emitted bundle of light extends substantially at right angles to the longitudinal axis of the vehicle, and moreover the said bundle of light diverges to a great extent in the horizontal plane. Tests have prooved that if an angle of divergency of 140° is used, the auxiliary light will illuminate a suitable area which extends in front of, to the side of and rearwardly of the automobile.

In order that the auxiliary light 4 shall illuminate the highway it is so arranged that the main axis of the light bundle forms an acute angle with the horizontal plane. However, the auxiliary device does not only illuminate the road proper, but also the landscape in a relatively great distance to the side of the road, in practice 100 millimeters or more.

The light field produced by each light device 4 cooperates with and forms an extension of the light field produced by the adjacent head light 2, and the result is that the driver of an automobile can see the highway without being dazzled by the light of the approaching automobile.

By the use of the auxiliary light devices 4 passage can take place without danger for dazzling with full power on the head lights 2 and accordingly without the necessity of reducing the speed of the vehicle. However, under certain circumstances it may be of advantage to reduce the illuminating power of the head lights 2, say to the half, during passage.

Figure 4:
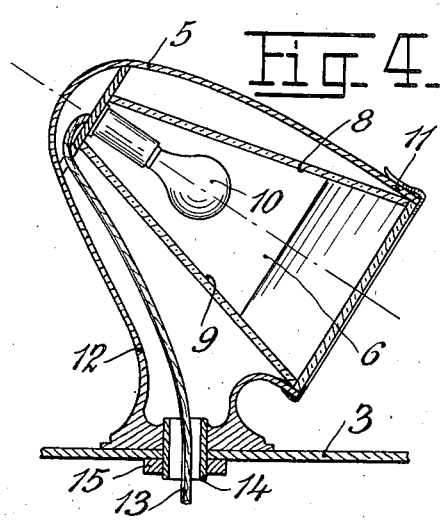
Fig. 4 is a vertical section through the auxiliary light device.
Figure 5:
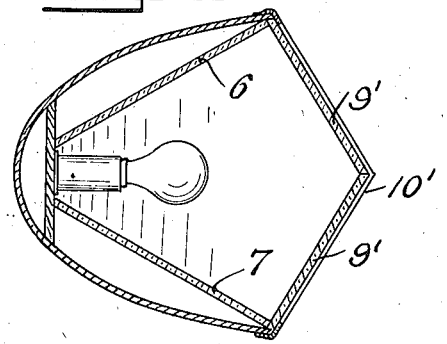
Fig. 5 is a horizontal section therethrough.

Figs. 4 and 5 illustrate a preferred form of the auxiliary light devices.

In an outer casing 5 is arranged a conical reflector the base of which is rectangular and moreover arranged as shown. The inner surfaces 6, 7 and 8 of the said cone act to reflect, whereas the lower surface 9 is matted in order to prevent the light of the source 10 from being reflected upwardly.

The source of light 10 is so placed that it cannot be seen by the driver of an approaching vehicle, and in order that passing pedestrians shall not see the source of light the top portion of the casing is extended as indicated by 11. The open ends of the casing and reflector are closed by two horizontally disposed transparent plates 9' arranged in the form of a V and preferably secured in position by a flanged and open frame 10'. These transparent plates 9' act to increase the angle of divergency of the projected light beam as indicated in Fig. 2 of the drawing.

The casing 5 is provided with a side arm 12 by means of which the device is secured to the mud guard 3. Said arm 12 may be hollow to take up the current conductors 13, and is provided with a base nipple 14 extending through the mud-guard 3 and secured thereto by a nut 15.

As will be understood it may be sufficient to arrange an auxiliary light device 4 at the left mud-guard only (in countries using right-driving), and a smaller side lamp at the other side which illuminate the ditch. However, preferably two side lights 4 should be used.

Having now particularly described and ascertained the nature of my said invention and in what manner the same is to be performed I declare that what I claim is:

An arrangement on vehicles for preventing dazzling in which the head lights are combined with additional lamps placed on the front mud guards, each of said additional lamps including a pyramidal reflector arranged transversely of the mud guard and tilted downwardly at a substantial angle and having the inner and upper end closed and the lower and outer end open, a source of light situated near the inner end of the reflector so that a single beam of light is projected downwardly and laterally of the vehicle by the reflector, and two horizontally disposed transparent plates arranged in a V-shaped manner for closing the outer end of the reflector and acting to increase the angle of divergency of the projected light beam.

In testimony whereof I affix my signature.

SERGEI MAKAROFF.